United States Patent [19]
Gilbert

[11] Patent Number: 4,542,850
[45] Date of Patent: Sep. 24, 1985

[54] CENTRAL HEATING METHOD AND PLANT

[76] Inventor: Chevalier Gilbert, 46 rue du Château, F-59283 Raimbeaucourt, France

[21] Appl. No.: 474,575
[22] PCT Filed: Jun. 17, 1982
[86] PCT No.: PCT/FR82/00100
 § 371 Date: Feb. 22, 1983
 § 102(e) Date: Feb. 22, 1983
[87] PCT Pub. No.: WO83/00063
 PCT Pub. Date: Jan. 6, 1983

[30] Foreign Application Priority Data
 Jun. 22, 1981 [FR] France ................. 81 12987

[51] Int. Cl.⁴ ............ F23N 1/08; F25B 27/02
[52] U.S. Cl. ................ 236/20 R; 237/2 B; 62/238.6; 62/183
[58] Field of Search .......... 237/2 B, 8 R, 19, 8 C; 62/324.1, 238.6, 183, 185, 177; 165/29; 236/20 R

[56] References Cited
 U.S. PATENT DOCUMENTS
 3,984,050 10/1976 Gustafsson .......... 237/2 B
 3,989,183 11/1976 Gustafsson .......... 237/2 B
 4,235,369 11/1980 Huber ............... 237/2 B FOREIGN PATENT DOCUMENTS
 2515289 10/1976 Fed. Rep. of Germany.
 2291455 6/1976 France ............... 237/2 B
 2394026 1/1979 France.

Primary Examiner—Henry Bennett
Attorney, Agent, or Firm—Spencer & Frank

[57] ABSTRACT

The invention relates to a method and a plant for the central heating of a building provided with at least one thermodynamic machine such as a heat pump or a refrigerating machine. The method is characterized in that, without affecting the normal operation of the thermodynamic machine, during the heating period:
when the temperature of the heat transfer fluid in the exchanger-accumulator tank reaches a certain threshold, the conduits via which the auxiliary boiler is connected to the circuit supplying the exchanger network are isolated and the return of this circuit to the tank is released while, on the other hand, when the temperature of the heat transfer fluid in the exchanger-accumulator tank drops below a certain threshold, the return to the exchanger-accumulator tank of the circuit supplying the exchangers is cut off and the auxiliary boiler whose discharge and return conduits are connected to the circuit is actuated.

8 Claims, 1 Drawing Figure

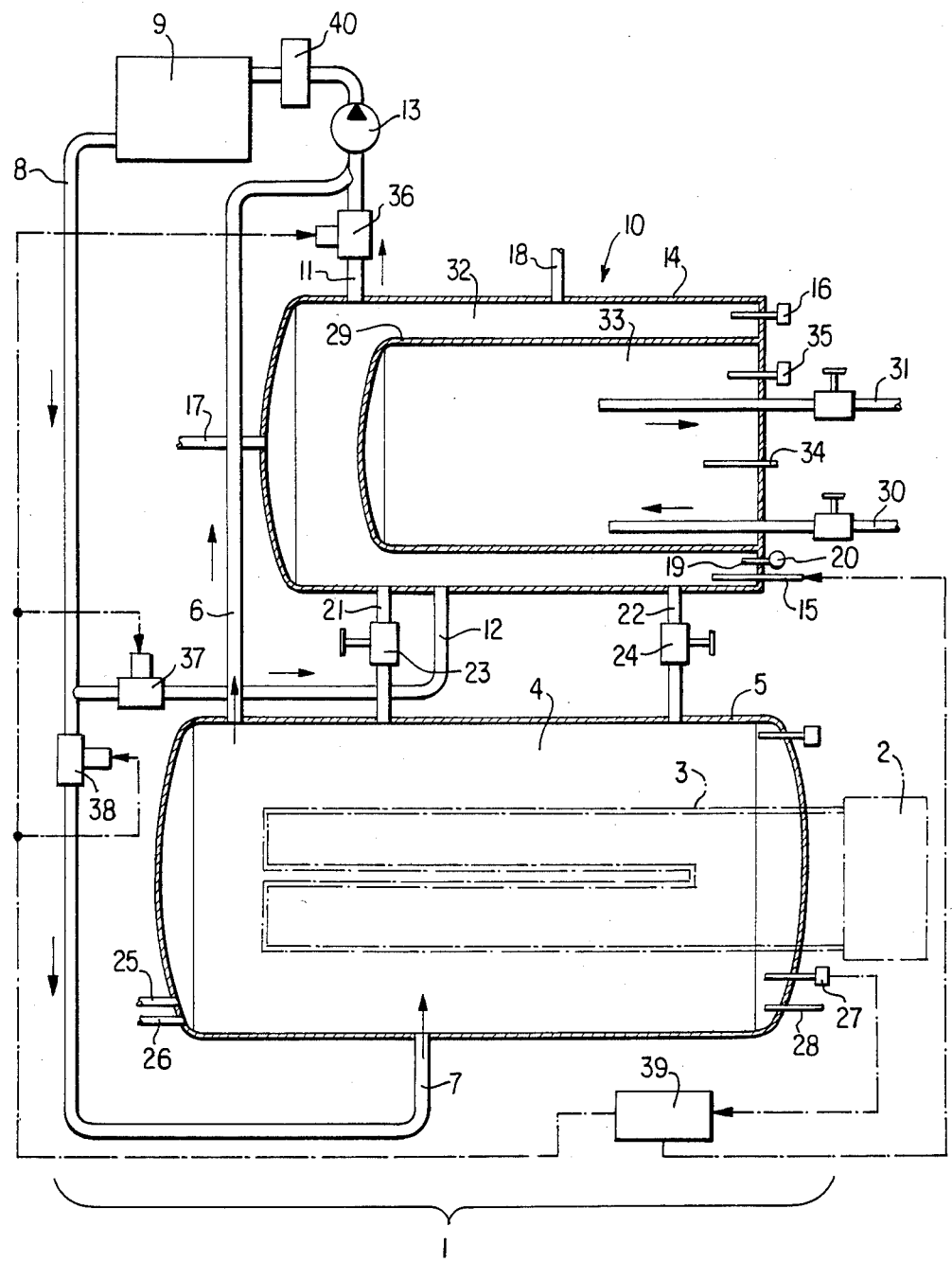

CENTRAL HEATING METHOD AND PLANT

BACKGROUND OF THE INVENTION

The invention relates to a central heating method and plant for a building additionally provided with at least one thermodynamic device such as a heat pump or a refrigerating device.

In these machines, a cooling fluid, is, in a known manner, by passage through a pressure reducing valve, brought to a relatively low pressure which enables it to evaporate at low temperature. It is then supplied to an evaporator in which it absorbs heat until it is completely evaporated.

The cooling vapor produced in this way is then brought to a relatively high temperature by a compressor which ensures its circulation and additionally its re-heating, after which the compressed gas is supplied to a condenser in which the coolant supplies at least part of its heat to a cooling agent by condensation.

While cooling, the coolant passes from the gaseous to the liquid state before being returned to the pressure reducer in order to commence a new cycle.

It is already known to recover, for a central heating plant, the heat available in this way from the high pressure circuit of the coolant (French Patent Specification No. 2 394 026 and the German Patent Specification No. 2 515 289).

These known constructions comprise, on one hand, a water tank recovering the heat released by the condensation of the coolant and which is stored in an accumulator tank to which there are connected the return and discharge conduits of a radiator network and, on the other hand, an auxiliary boiler providing the water of the radiator network with the heat which may be lacking in the accumulator.

In the plant described in the French Patent Specification No. 2 394 026, the thermodynamic device is actuated when an aquastat detects a temperature decrease in the tank whilst the boiler is actuated by the thermostats of the radiator network and a general thermostat.

This boiler operates as follows: its return circuit takes part of the water in the conduit which, as it comes from the accumulator tank, is moving towards the radiators and after re-heating this water, its discharge circuit adds an equivalent amount of water to the conduit by means of a regulator valve.

When mixed with the water of the circuit passing through the accumulator tank, the water heated by the auxiliary boiler re-heats this water which then acts on the thermostat in order to prevent the release of heat to the condenser of the thermodynamic device.

As a result of this, during use of the auxiliary boiler, i.e. at times when heating requirements are greater, the plant is not able to recover, and therefore accumulate, heat from the thermodynamic device since it is not in operation.

It is true that even in the case in which the thermostat maintains the thermodynamic device in operation the water of the exchanger-accumulator tank, reheated by the auxiliary boiler, would then be too hot to succeed in taking heat from the condenser of the said machine since in the latter the coolant would be at a temperature almost identical to that of the water which would prevent any exchange.

This is therefore the reason why the thermodynamic machine, which is a heat pump in this case, is only actuated during the infrequent times when the water of the accumulator tank is not re-heated by the boiler which does not, however, provide sufficient use to set off the considerable investment required for a heat pump which would not have any other use so as to be able to be controlled as a function of the heating requirements alone.

On the other hand, this prevents the use of a thermodynamic machine which would have a further use such as a refrigerating device which could not be stopped and operated as a function of heating requirements but solely as a function of cooling requirements and whose heat then released to the condenser is the more considerable as without this recovery it would be lost and, in this way, may be considered to be free.

The same drawbacks are to be found in the plant disclosed in the German Patent Specification No. 2 515 289 as a result of the fact that it is designed such that the heating of the water of the accumulator tank by the heat taken from the condenser of the thermodynamic machine, which is also a heat pump not designed for other uses, is only controlled as a function of criteria which are foreign to the requirements of the thermodynamic machine itself which, whatever the case, is stopped on actuation of the auxiliary boiler which takes place at exact times.

SUMMARY OF THE INVENTION

A result which the invention aims to achieve is a heating method and plant which remedies these drawbacks and which is therefore suitable for the recovery of heat from the condensation circuit of a thermodynamic machine, such as a heat pump, but also and, in particular, from the condensation circuit of a refrigerating machine whose operation and stoppage remain independent of the operation or stoppage of the boiler and the heating in general.

For this purpose, the invention relates to a heating method characterized in particular in that, without affecting the normal operation of the thermodynamic machine, during the heating period:

as soon as the the temperature of the heat transfer fluid reaches a certain threshold, for example forty degrees, in the exchanger-accumulator tank, the conduits via which the boiler is connected to the circuit supplying the exchanger network are isolated and the return of this circuit to the tank is released while, on the other hand, as soon as the temperature of the heat transfer fluid drops below a certain threshold, for example forty degrees, the return to the exchanger-accumulator tank of the circuit supplying the exchangers is cut off and the auxiliary boiler has its discharge and return conduits connected to the said circuit supplying the exchangers.

The invention also relates to a heating plant using this method.

BRIEF DESCRIPTION OF THE DRAWING

The invention is described in the following description, given by way of non-limiting example with reference to the attached drawing which shows diagrammatically a plant according to a preferred embodiment of the invention.

DESCRIPTION OF THE PREFERRED EMBODIMENT

With reference to the drawing, it can be seen that the plant 1 is combined with at least one thermodynamic machine 2, such as a refrigerating machine, whose circuit 3 is shown and in which the coolant circulates in the gaseous state, the condensation of this coolant releasing heat.

In order to cause condensation, the circuit 3 for the coolant is externally cooled by a cooling agent 4 which, in exchange, absorbs the heat released in this way.

In a known manner, the cooling agent is a heat transfer fluid, such as the water contained in a tank 5 encasing the coolant circuit 3, so as to recover and accumulate the heat which it releases.

The discharge and return conduits, 6 and 7 respectively, of a circuit 8 supplying an exchanger network 9, such as radiators, are connected to this exchange and accumulation tank.

The plant 1 also comprises, in a known manner, an auxiliary boiler 10 designed to provide the heat transfer fluid passing through the exchangers 9 with the heat which may be lacking in the exchange and accumulation tank 5.

For this purpose, its discharge and return conduits, 11 and 12 respectively, are connected to the circuit 8 supplying the exchanger network, which circuit also comprises a pump 13 controlling the circulation of the heat transfer fluid in the said exchangers 9.

The auxiliary boiler 10 may be of any known type and may for example be constituted by an electric boiler formed by a tank 14 into which at least one immersion heater element 15 penetrates.

In accordance with a characteristic feature of the invention, for ease in emptying and filling and for other reasons which will be discussed below, the tank 14 of the auxiliary boiler 10 is connected to the exchanger-accumulator tank 5 by at least one conduit 21, 22 controlled by valves 23, 24, which are preferably manual, and which, during heating periods, are normally always closed.

The exchange and accumulation tank 5 also has connected to it a filling conduit 25 and an emptying conduit 26 and the control elements, such as an aquastat 27.

A heating source, such as an electrode 28 could also be provided in the exchange and accumulation tank 15 if only to facilitate the periodic defrosting of the evaporator (not shown), for the purposes of which defrosting the operating cycle of the thermodynamic machine is generally reversed.

The tank of the auxiliary boiler 10 may also have immersed in it a reservoir 29 filled with water which, after heating, is designed to be used for domestic appliances.

For this purpose, this reservoir is connected to a supply conduit 30 and to a conduit 31 from which hot water may be drawn.

In addition to the heat provided by the heating water 32 in which the reservoir is immersed, the hot water 33 for domestic purposes may be heated by an auxiliary source, such as an electrode 34 operated in accordance with the data received by an aquastat 35 immersed in the reservoir 29.

In accordance with an essential characteristic feature of the invention, without affecting the normal operation of the thermodynamic machine, during the heating period:

as soon as, in the exchanger-accumulator tank 5, the temperature of the heat transfer fluid 4 reaches a certain threshold, for example forty degrees, the conduits 11, 12 via which the auxiliary boiler 10 is connected to the circuit 8 supplying the exchanger network 9 are isolated and the return of this circuit to the exchanger-accumulator tank is released while, on the other hand, as soon as the temperature of the heat transfer fluid in the exchanger-accumulator tank 5 drops below a certain threshold, for example forty degrees, the return to the exchanger-accumulator tank 5 of the circuit 8 supplying the exchangers 9 is cut off and the auxiliary boiler 10 is actuated and its discharge and return conduits, 11 and 12 respectively, are connected to the said circuit 8 supplying the exchangers 9.

By means of this process, in which the thermodynamic machine is at all times able to continue its operation, priority is given to the recovery of the heat in the tank 5.

As soon as its water has reached a sufficient temperature, it undertakes the heating function without passing through the boiler tank whose immersion heater 15 may be stopped insofar as its own aquastat 16 does not detect cooling below the fixed threshold so that, when operated again, the water may be used immediately.

Although this is the case, as the boiler is isolated from the exchanger circuit, this temperature holding operation hardly uses any power.

When the water in the tank 5 is not sufficiently hot, instead of adding hotter water to the tank, the tank is isolated so that anything which may be recovered from the thermodynamic machine which is performing its own operating cycle is conserved and therefore rapidly re-establishes a sufficient temperature in the tank.

In accordance with another characteristic of the method of the invention, outside of heating periods and when there is only a requirement for domestic purposes, the circulation of the heat transfer fluid is discontinued in the circuit 8 supplying the exchangers and the communication conduits provided for this purpose between the tank 14 of the auxiliary boiler 10 and the exchanger-accumulator tank 5 are opened so that, under a thermosiphon effect, the water of the exchanger-accumulator tank circulates in the tank 14 of the boiler 10 in order to heat the reservoir 29 for the water 33 for domestic purposes.

In order to enable this method to be carried out, in accordance with an essential feature of the invention, the plant comprises, on one hand, controlled valves 36 and 37 controlling the connection of the discharge and return conduits, 11 and 12 respectively, of the auxiliary boiler 10 in the circuit 8 supplying the exchangers 9 and a controlled insulation member 38, interposed between the return 7 to the exchanger-accumulator tank 5 and the circuit 8 supplying the exchangers and, on the other hand, in the exchanger-accumulator tank 5, the aquastat 27 is connected is connected both to the immersion heater element 15 for the boiler and to that of the controlled valves 36 and 37 and the isolation member 38.

The controlled valves 36 and 37 and the isolation element 38 are constituted, for example by electrovalves driven by a control circuit 39 comprising, for example, reversers or relays or a microprocessor receiving data from the aquastat 27.

In a variant, the aquastat is also connected to the pump control 13 and the plant, in particular with respect to the circuit 8 supplying the exchanger network, in addition comprises at least one valve 40 which stops the circulation of water by a simple thermosiphon effect so as to enable, as a result of the operation or the stoppage of the pump 13, the circulation or the stoppage of the heat transfer fluid.

In the case of a building containing several thermodynamic machines, it is obvious that the heating plant could comprise several circuits 3 for the cooling fluid in a same tank and/or several exchanger-accumulator tanks 5 mounted in series.

I claim:

1. A central heating plant for supplying a heat transfer fluid to an exchanger network, said plant including at least one thermodynamic device, comprising
   an exchanger-accumulator tank including at least one circuit connected to said thermodynamic device for circulating a cooling fluid, the heat released in said circuit by the condensation of said cooling fluid being recovered in a portion of said heat transfer fluid contained within said exchanger-accumulator tank;
   first conduit means for connecting said exchanger-accumulator tank to said exchanger network, said first conduit means having a discharge portion for conducting said heat transfer fluid from said exchanger-accumulator tank to said exchanger network and a return portion for conducting said fluid from said exchanger network to said exchanger-accumulator tank;
   an auxiliary boiler containing another portion of said heat transfer fluid;
   second conduit means for connecting said auxiliary boiler to said exchanger network, said second conduit means having a discharge portion for conducting said heat transfer fluid from said auxiliary boiler to said exchanger network and a return portion for conducting said fluid from said exchanger network to said auxiliary boiler; and
   control means coupled to said first and second conduit means to initiate flow of said heat transfer fluid from said exchanger-accumulator tank to said exchanger network when the temperature of the heat transfer fluid within said exchanger-accumulator tank reaches a predetermined value and to simultaneously discontinue the flow of heat transfer fluid from said auxiliary boiler to said exchanger network, said control means further permitting flow of said heat transfer fluid from said auxiliary boiler to said exchanger network when the temperature of the heat transfer fluid within said exchanger-accumulator tank is below said predetermined value and to simultaneously discontinue the flow of heat transfer fluid from said exchanger-accumulator tank to said exchanger network, said thermodynamic device operating independently of the heating requirements of said exchanger network.

2. A central heating plant as claimed in claim 1, wherein said auxiliary boiler is provided with a reservoir for domestic hot water, and wherein a connection is provided for flow of said heat transfer fluid between said exchanger-accumulator tank and said auxiliary boiler, the domestic hot water in said reservoir being heated by the heat transfer fluid circulated between said exchanger-accumulator tank and said auxiliary boiler when circulation of heat transfer fluid to said exchanger network is discontinued.

3. A central heating plant as claimed in claim 1, wherein said control means comprises
   first and second valves connected in the discharge and return portions respectively of said second conduit means;
   an isolation element connected in the return portion of said first conduit means;
   and, an aquastat immersed in the heat transfer fluid contained within said exchanger-accumulator tank for generating a signal corresponding to the temperature of the heat transfer fluid within said tank, the signal from said aquastat closing said first and second valves and opening said isolation element when the temperature in said exchanger-accumulator tank reaches said predetermined value, and said signal opening said first and second valves and closing said isolation element when the temperature in said exchanger-accumulator tank is below said predetermined value.

4. A central heating plant as claimed in claim 3, wherein said auxiliary boiler includes an immersion heater connected to the aquastat immersed in the heat transfer fluid in said exchanger-accumulator tank, the signal from said aquastat stopping operation of said immersion heater when the temperature of the heat transfer fluids in said exchanger-accumulator tank and said auxiliary boiler have reached a predetermined value.

5. A central heating plant as claimed in claim 3, wherein said auxiliary boiler is provided with a reservoir for domestic hot water; a pump is coupled in series with said exchanger network for controlling the flow of said heat transfer fluid to said exchanger network from said first and second conduit means, said pump being controlled by the signal from said aquastat; a valve is connected in series with said pump for cutting off circulation of said heat transfer fluid to said exchanger network; and a connection is provided for flow of said heat transfer fluid between said exchanger-accumulator tank and said auxiliary boiler.

6. In a central heating plant including at least one thermodynamic device, an exchanger-accumulator tank including at least one circuit connected to said thermodynamic device for circulating a cooling fluid, an auxiliary boiler, and conduit means connecting said exchanger-accumulator tank and said auxiliary boiler to an exchanger network for conducting a heat transfer fluid from said tank and said boiler to said network, the method of controlling the flow of said heat transfer fluid to said exchanger network comprising the steps of
   determining the temperature of the heat transfer fluid within said exchanger-accumulator tank;
   transferring only the heat transfer fluid within said auxiliary boiler to said exchanger network when the temperature within said exchanger-accumulator tank is below a predetermined value; and
   transferring only the heat transfer fluid within said exchanger-accumulator tank to said exchanger network when the temperature within said exchanger-accumulator tank reaches said predetermined value, whereby said thermodynamic device operates independently of the heating requirements of said exchanger network.

7. The method claimed in claim 6 wherein said central heating plant further includes a reservoir for domestic hot water located within said auxiliary boiler and a connection from said exchanger-accumulator tank to said auxiliary boiler for conducting said heat transfer fluid therebetween, said method including the further steps of stopping flow of said heat transfer fluid to said exchanger network; and transferring said heat transfer fluid within said exchanger-accumulator tank to said auxiliary boiler for heating the domestic hot water in said reservoir.

8. A central heating plant as claimed in claim 1, wherein said thermodynamic device is a refrigerating machine which operates independently of the portion of said central heating plant used for supplying said heat transfer fluid to said exchanger network.

* * * * *

UNITED STATES PATENT AND TRADEMARK OFFICE
CERTIFICATE OF CORRECTION

PATENT NO. : 4,542,850
DATED : September 24th, 1985
INVENTOR(S) : Gilbert Chevalier It is certified that error appears in the above—identified patent and that said Letters Patent is hereby corrected as shown below:

In the heading of the patent, under [76] the inventor's name should read --Gilbert Chevalier--.

Signed and Sealed this

Eighteenth Day of February 1986

[SEAL]

Attest:

DONALD J. QUIGG

*Attesting Officer*      *Commissioner of Patents and Trademarks*